United States Patent Office 2,803,631
Patented Aug. 20, 1957

2,803,631
BIS-BICYCLOAZAOCTANE QUATERNARY SALTS

Leonard M. Rice, Baltimore, Md., and Charles H. Grogan, Falls Church, Va., assignors to The Geschickter Fund for Medical Research, Inc., Washington, D. C., a corporation of New York No Drawing. Application June 4, 1954, Serial No. 434,673

6 Claims. (Cl. 260—293)

This invention relates to compositions of matter, particularly to chemo-therapeutic organic compounds and methods of their preparation, and more particularly to compounds of value in the treatment of cardio-vascular and other diseases.

Specifically the invention involves the discovery and contemplates disclosure of novel compounds, namely the bis-quaternary salts of bicycloazaoctane.

Accordingly, it is a basic object of the present invention to provide novel organic compounds and methods for the preparation thereof.

Another object is to provide novel physiologically active compounds characterized by chemo-therapeutic or medicinal properties in the treatment of diseases, particularly hypertension.

A more specific object is to provide novel compounds, namely, the bis-quaternary salts of bicycloazaoctane.

Another and equally important object of the invention is to provide methods of synthesizing the novel compounds referred to in the foregoing objects.

These and other subordinate objects and the manner in which they are acomplished will become apparent to those conversant with the art from the following description of the general class of compounds and certain specific examples of particular members thereof as well as the method of their synthesis.

The novel therapeutic compounds discovered are bis-quaternary salts of 1-methyl-8,8-dimethyl-3-azabicyclo (3,2,1) octane having the following general structural formula:

[structural formula]

Generally stated, the novel compounds discovered are obtained by forming the N-alkyl imides of D-, DL-, or L-camphoric anhydride and the reduction of these imides, as fully explained in copending application Serial No. 388,062 filed October 23, 1953 and now abandoned, to obtain the N-alkyl norcamphidine bases which may be converted into their bis-quaternary salts as hereinafter described.

The above formula shows the general molecular structure of the compounds obtained by the method more particularly described hereinbelow. In the formula, $n$ designates the number of carbon atoms in the alkylene group ($CH_2$), $n$ being from one to ten, and $X^-$ represents a halogen anion such as iodide, chloride, or bromide. The site of quaternary salt formation is on the nitrogens of the bicycloazaoctane nuclei.

These bis-quaternary salts possess a marked hypotensive activity in mammals at a low dosage level and at the same time a favorable therapeutic ratio. The following example of a specific compound and method of its synthesis will illustrate the general synthesizing procedure which may be applied to obtain other particular members of the class of compounds discovered. It will be understood, however, that the following example is not nor is it intended to be exhaustive of all compounds embraced by the discovery.

EXAMPLE

Bis-3,3-[1-methyl-8,8-dimethyl-3-azabicyclo (3,3,1) octyl] propane methionium iodide

[structural formula]

16.83 grams (0.1 mole) of N-methyl-1-methyl-8,8-dimethyl-3-azabicyclo (3,2,1) octane referred to in the aforementioned application Serial No. 388,062 was mixed with 14.79 grams (0.05 mole) of trimethylene diiodide dissolved in 45 ml. of isopropanol. The mixture was heated in a sealed vessel for approximately six hours at a temperature of 100° C. and then allowed to cool. After cooling absolute alcohol and ether were added in succession until the reaction mixture became turbid. The mixture was allowed to stand, was filtered, and the precipitate recrystallized twice from alcohol ether. The product so obtained has a melting point of 233–235° C. Analysis for the formula $C_{25}H_{48}I_2N_2$ indicates a theoretical iodide content of 40.26% and 40.25%. Iodide was actually found in the compound.

The following table includes this and five additional exemplary compounds prepared in a manner wholly analogous to that described above.

Bis-3,3-[1-methyl-8,8-dimethyl-3-azabicyclo (3,2,1)octyl] alkane methionium salts

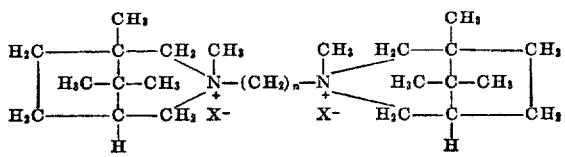

| $n$ | Formula | Melting Point, °C. | $X^-$ | Analysis for $X^-$, Percent | |
|---|---|---|---|---|---|
| | | | | Calculated | Found |
| 1 | $C_{23}H_{44}I_2N_2$ | 291–294 | I | 42.14 | 41.93 |
| 2 | $C_{24}H_{46}Br_2N_2$ | 200–202 | Br | 30.59 | 30.43 |
| 3 | $C_{25}H_{48}I_2N_2$ | 233–235 | I | 40.26 | 40.25 |
| 4 | $C_{26}H_{50}I_2N_2$ | 253–254 | I | 39.38 | 39.52 |
| 5 | $C_{27}H_{52}I_2N_2$ | 255–256 | I | 38.55 | 38.68 |
| 6 | $C_{28}H_{54}I_2N_2$ | 230–231 | I | 37.89 | 37.82 |

As previously mentioned, the novel compounds disclosed herein are highly efficacious in the treatment of physiological disorders particularly those requiring hypotensive effects. For relief of hypertension 25 milligrams of the bis-quaternary salts in parenteral solution may be administered once a day or 50 to 250 milligrams may be given orally in the form of tablets, capsules or the like.

From the foregoing description of the novel class of compounds, particular exemplary members of the class and methods of synthesizing same, it will be understood that, on the basis of the discovery and knowledge disclosed herein, other specific compounds can be made and variations in the methods of synthesis resorted to. Therefore, the specific compounds and methods disclosed herein are to be considered in all respects as illustrative and not restrictive, the scope of the discovery being indicated by the appended claims rather than the foregoing description, and all specific compounds and variations in methods which come within the meaning and range of equivalency of the claims are intended to be embraced therein.

What is claimed and desired to be secured by United States Letters Patent is:

1. A novel composition of matter comprising a compound selected from the group consisting of the bis-quaternary salts of azabicyclooctane having the formula:

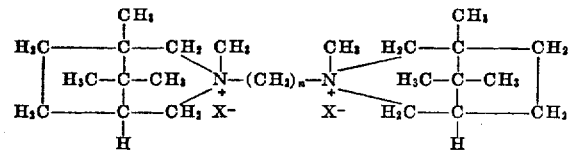

in which $n$ is a whole number from 1 to 6 and $X^-$ is a halogen ion selected from the group consisting of chloride, bromide and iodide.

2. Bis-3,3-[1-methyl-8,8-dimethyl-3-azabicyclo (3,2,1) octyl] methane methionium halide.

3. Bis-3,3-[1-methyl-8,8-dimethyl-3-azabicyclo (3,2,1) octyl] ethane methionium halide.

4. Bis-3,3-[1-methyl-8,8-dimethyl-3-azabicyclo (3,2,1) octyl] propane methionium halide.

5. Bis-3,3-[1-methyl-8,8-dimethyl-3-azabicyclo (3,2,1) octyl] butane methionium halide.

6. Bis-3,3-[1-methyl-8,8-dimethyl-3-azabicyclo (3,2,1) octyl] pentane methionium halide.

References Cited in the file of this patent

Simons: Industrial and Engineering Chemistry, vol. 39, p. 238, 1947.

Auwers: Chemical Abstracts, vol. 17, p. 1644, 1923.

UNITED STATES PATENT OFFICE
Certificate of Correction

Patent No. 2,803,631  August 20, 1957

Leonard M. Rice et al.

It is hereby certified that error appears in the printed specification of the above numbered patent requiring correction and that the said Letters Patent should read as corrected below.

Column 1, line 57, for "norcamphidine" read —camphidine—; column 2, line 7, for "(3,3,1)" read —(3,2,1)—; same column, lines 10 to 13, the formula should appear as shown below instead of as in the patent—

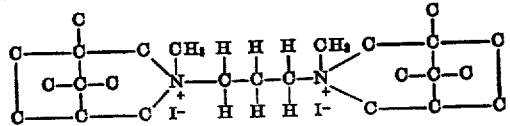

same column 2, lines 36 to 40, the formula should appear as shown below instead of as in the patent—

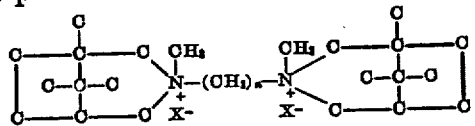

same column 2, line 28, for "40.25%. Iodide was" read —40.25% iodide was—.

Signed and sealed this 29th day of October 1957.

[SEAL]

Attest:
KARL H. AXLINE,
*Attesting Officer.*

ROBERT C. WATSON,
*Commissioner of Patents.*